United States Patent [19]

Shiraishi

[11] Patent Number: 5,189,617
[45] Date of Patent: Feb. 23, 1993

[54] MOTOR VEHICLE CONTROL SYSTEM AND CONTROL UNIT THEREFOR

[75] Inventor: Takashi Shiraishi, Ibaraki, Japan
[73] Assignee: Hitachi, Ltd., Tokyo, Japan
[21] Appl. No.: 602,466
[22] Filed: Oct. 23, 1990
[30] Foreign Application Priority Data
   Oct. 27, 1989 [JP] Japan .................................. 1-278394
[51] Int. Cl.$^5$ ............................................. G06F 15/20
[52] U.S. Cl. ........................... 364/424.05; 364/424.01
[58] Field of Search ........... 364/131, 138, 139, 424.01, 364/424.05, 431.04

[56] References Cited

U.S. PATENT DOCUMENTS

| | | | |
|---|---|---|---|
| 4,535,401 | 8/1985 | Penn | 364/132 |
| 4,556,943 | 12/1985 | Pauwels et al. | 364/431.12 |
| 4,894,781 | 1/1990 | Sato et al. | 364/431.11 |
| 4,933,862 | 6/1990 | Wataya | 364/431.06 |
| 4,991,101 | 2/1991 | Ishikawa | 364/431.05 |
| 5,032,997 | 7/1991 | Kawagoe | 364/424.05 |
| 5,091,856 | 2/1992 | Hasegawa et al. | 364/424.05 |

*Primary Examiner*—Thomas G. Black
*Attorney, Agent, or Firm*—Ladas & Parry

[57] ABSTRACT

A motor vehicle control system and a control unit therefor is described, the control unit being arranged to calculate a control parameter based upon data derived from a sensor output and to drive at least one actuator in accordance with the calculated parameter. The control unit is adapted to communicate with a plurality of other control units and each of the control units comprises a transmitting means adapted to transmit interrogation signals to other control units and a receiving means adapted to receive response signals from the other control units in response to the interrogation signals. A microcomputer is provided adapted to vary the control parameter of each of the control units in dependence upon the existence of responses received by the receiving means of each control unit.

19 Claims, 11 Drawing Sheets

Fig.11(b) | START | 1 0 0 0   0 0 0 1 | STOP

Fig.11(c) | START | 1 0 0 0   0 0 1 0 | STOP

Fig.11(d) | START | 1 0 0 0   0 0 1 1 | STOP

Fig.11(e) | START | 1 0 0 0   0 1 0 0 | STOP

MOTOR VEHICLE CONTROL SYSTEM AND CONTROL UNIT THEREFOR

BACKGROUND OF THE INVENTION

1. Field of the Invention

This invention relates to a motor vehicle, such as an automobile, control system, and particularly, although not exclusively, to a motor vehicle control system provided with a plurality of control units.

2. Description of Related Art

It is known to use a microcomputer to control fuel supply or ignition timing for an automobile engine so as to improve fuel consumption and exhaust emissions. Microcomputer control of the operation or status of the automobile engine may be performed, as disclosed for instance in Japanese Patent Laid-Open No. 54-59529 (1979), through repeated calculation in an extremely short time based on the calculated results of the output data from a sensor.

Recently, however, the needs for enhanced quality of operation, improved drivability and comfort have become more important, requiring precise and sophisticated control of traction, automatic transmission gear shifts and/or suspension characteristics. As a result, there have been proposed several control means such as microcomputer controlled traction equipment, as disclosed in Japanese Patent Laid-Open No. 63-314332 (1988), microcomputer controlled changes (shifts) of automatic transmission gears as disclosed in Japanese Patent Laid-Open No. 63-57953 (1988), or microcomputer controlled suspension means as disclosed in Japanese Patent Laid-Open No. 61-295112 (1986).

On the other hand, there have been discussed and pursued new approaches toward a total control of an automobile by what is called a cooperative control including such control means as described above wherein they function not independently but in the best cooperative manner so that they may achieve an optimum performance under a given condition.

In the prior art, however, there has not been sufficient consideration to the particular configuration of control units relative to the total control performance of an automobile. In other words, the requirements for automobiles differ largely by type or model, some requiring better travel performance or fuel consumption, some requiring enhanced drivability or more comfort. Thus, control units to be mounted may differ largely according to specific requirements, and sometimes, they may be eliminated because of economy.

In order to provide an optimum total control for an automobile, the total control configuration in the automobile must be carefully considered according to the type of control units and the number of control units to be used. For this purpose, the detail or content of each control unit must be determined by carefully considering cooperative control assignments between each control unit. Therefore, when the need arises in the design of a make or model of automobile to change one control unit, it has been necessary to change the control functions of other, related, control units.

As a result, problems have arisen which have resulted in prolonged periods of time in developing control units, impairment in mass production and serviceability, and the like.

The object of the present invention is to provide a motor vehicle control whereby modification of a control unit is no longer required between different makes/models, further facilitating speedy development of control units, mass production, and serviceability in the market.

SUMMARY OF THE INVENTION

According to one aspect of this invention there is provided a control unit for a motor vehicle control system, said control unit being adapted to calculate a control parameter based upon data derived from a sensor output and to drive at least one actuator means in accordance with the calculated parameter, characterised in that each control unit comprises a transmitting means adapted to transmit an interrogation signal to other control units and a receiving means adapted to receive response signals from said other control units in response to the interrogation signals, and modifying means adapted to vary the control parameter in dependence upon the existence of the responses received by said receiving means.

According to another aspect of this invention there is provided a motor vehicle control system having a plurality of control units each arranged to calculate a control parameter based upon data derived from an associated sensor output and to drive at least one associated actuator means in accordance with the calculated parameter, characterised in that each said control unit comprises a transmitter means adapted to transmit interrogation signals to other control units and a receiving means adapted to receive response signals from said other control units in response to said interrogation signals, and said system including modifying means adapted to vary the control parameter in dependence upon the existence of responses received by said receiving means.

Preferably, one of the control units is adapted to act as a host unit transmitting interrogation signals to the other control units, but advantageously all said other control units are adapted to provide response signals to all the control units.

In a currently preferred embodiment, the host control unit is arranged to be an engine control unit and the other units are at least one of an auto-gear shift control unit, a traction control unit, a suspension control unit, and a knock control unit.

Advantageously, the interrogation signal is transmitted at least twice to said other control units and, conveniently, said interrogation signal is transmitted when the vehicle ignition switch is turned on. Preferably, the modifying means includes a memory means adapted to retain stored data pertaining to received response signals and means adapted to write in said memory means the existence of a received response signal.

Advantageously, there is provided a comparing means adapted to compare a received response signal with a previously stored response signal and an abnormality judging means adapted to identify an absence or abnormality in the interrogated control units by utilizing the compared results from said comparing means.

Advantageously, a pseudo-signal generator means is adapted to output a fail-safe signal so as to simulate a said other control unit which is adjudged by said abnormality judging means to have an abnormality.

Conveniently, at ignition switch-on the host control unit is adapted to initially act upon preceding data stored in said memory means. Advantageously, each control unit is capable of continuing its function in accordance with data stored in the memory means until a response signal is received to the interrogation signal.

Preferably, each control unit is adapted to output a configuration checking termination signal after confirming the existence of said response signals and, advantageously, each control unit comprises an updating means to update data stored in said memory means after confirming the existence of said response signal.

Advantageously, each control unit is linked by a serial communication line.

Conveniently, the interrogation signal is a serial communication signal comprising a start bit, data bit and a stop bit, and the communication signals may include an upper bit portion denoting a control unit address and a lower bit portion denoting controlling information relative to the control unit.

Preferably, the modifying means comprises a microcomputer which microcomputer includes said memory means, writing means, comparing means, abnormality judging means and said pseuo-signal generating means.

More particularly, in this invention a control unit sends an address call to other control units, and if there is a response, said control unit automatically switches to select from a control menu a program that allows a cooperative control with said other control units which have given an answer back.

Because the control unit automatically chooses a control specification or details, there is no need to change the entire configuration of the control unit for cooperative control if a change of a single control unit is required, thereby readily providing a cooperative control between the control units on board the vehicle according to their updated total configuration.

BRIEF DESCRIPTION OF THE DRAWINGS

The invention will now be described, by way of example, with reference to the accompanying drawings in which:

FIGS. 13(a) and (b) respectively show a flowchart of the details of control for an automatic gear change (shift) control unit, and data configuration of transmitting and receiving signals therefor.

In the Figures, like reference numerals denote like parts.

DESCRIPTION OF THE PREFERRED EMBODIMENTS

Figure 1:
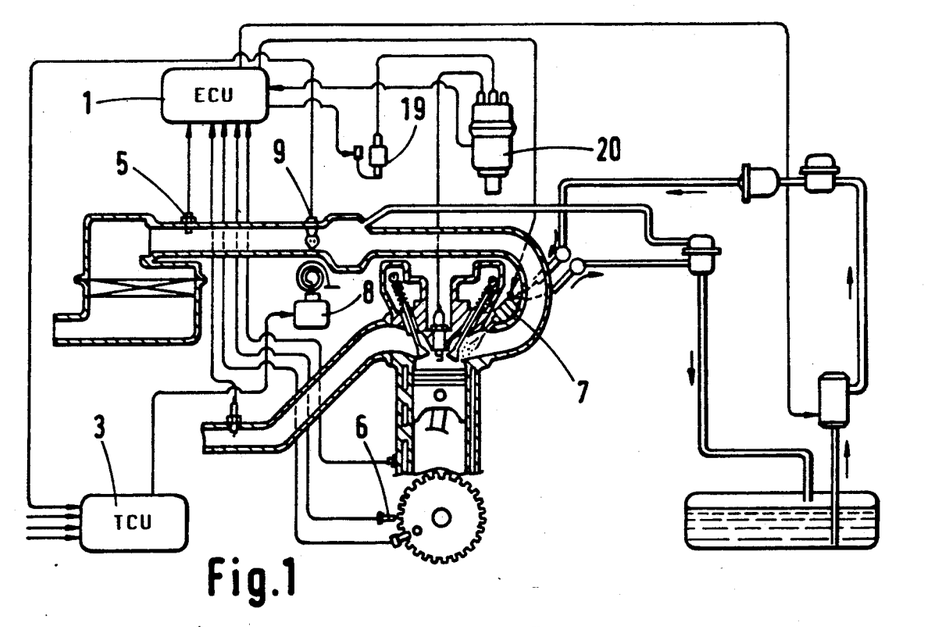
FIG. 1 shows a motor vehicle control system.
Figure 2:
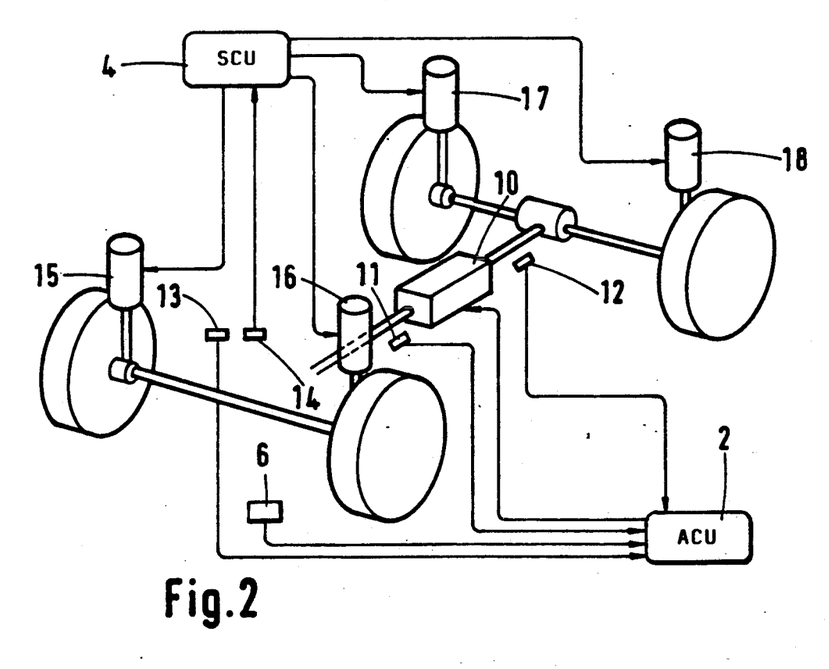
FIG. 2 diagrammatically shows an automobile system of control units.

The motor vehicle control system shown in FIGS. 1 and 2 preferably has a plurality of control units, e.g., an engine control unit 1(ECU), an automatic transmission gear control unit 2(ACU), a traction control unit 3(TCU), and a suspension control unit 4(SCU).

Each of these control units will be hereinafter explained.

Referring particularly to FIG. 1, based on the outputs from an air flow sensor 5 and a crank angle sensor 6, the engine control unit 1(ECU) calculates the quantity of fuel to be supplied to combustion chambers and controls a fuel injector 7, and at the same time calculates ignition timing to control an ignition power transistor 19 connected to a high voltage distributor 20.

Based on the outputs from a throttle opening sensor 9, and other sensors not shown in the FIG. 1 such as a wheel revolution sensor for detecting revolution status of the wheels, a torque sensor for detecting the amount of torque on the drive shaft, and an acceleration sensor for detecting the amount of acceleration, the traction control unit 3(TCU) calculates the quantity of control for an actuator 8 to control the actuator in dependence upon the associated sensor outputs.

Referring to FIG. 2, the automatic transmission gear control unit 2(ACU) calculates the required gear ratio, based on the outputs from a speedometer 13 and the crank angle sensor 6, and controls a transmission unit 10 so as to match the required gear ratio with outputs from shaft revolution sensors 11 and 12 detecting the transmission unit input and output shaft speeds, respectively.

The suspension control unit 4(SCU) calculates and determines the damping capacity of shock absorbers 15 to 18 based on the output from a vibration sensor 14.

Figure 3:
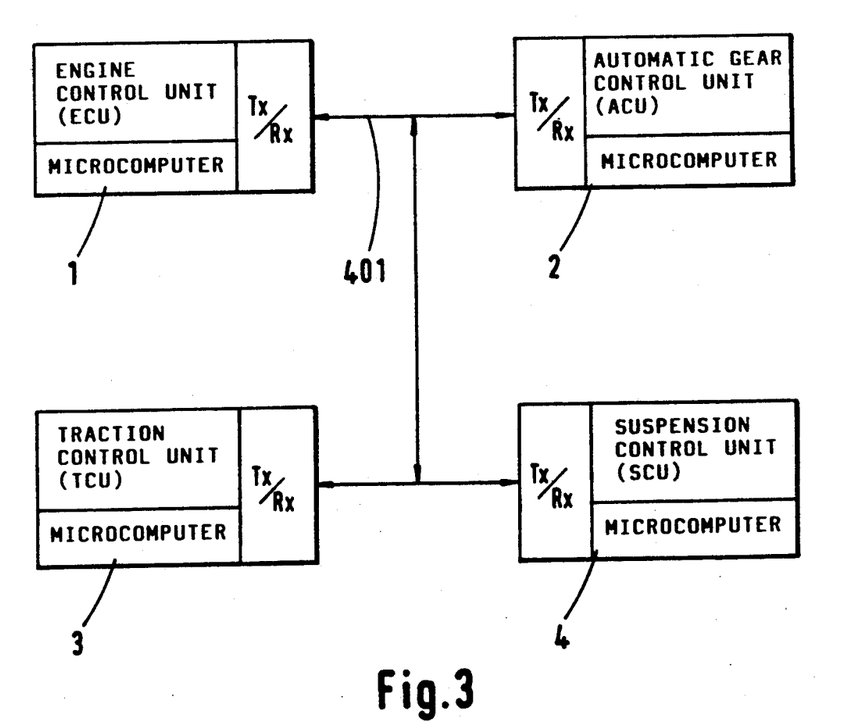
FIG. 3 is a block diagrammatic configuration of control units in accordance with a first embodiment of this invention.

As shown in FIG. 3, each control unit is linked by a serial communication line 401. Each control unit sends out control signals and receives control signals through the serial communication line for exchanging necessary control information with control units.

Figure 4A:
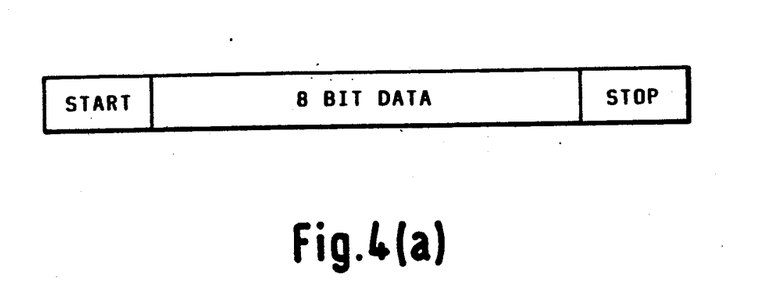
FIG. 4(a) shows the configuration of transmitting and receiving signals.

Each control unit exchanges control information by transmitting or receiving a signal consisting of a start bit, 8 data bits and a stop bit, as shown in FIG. 4(a).

The start bit preceding the data bits denotes the start of data transmission, while the stop bit following the data bits denotes the end of data transmission. Further, the 8 data bits are divided into two parts; an upper 4 bits and a lower 4 bits. In the upper 4 bit part are stored the data associated with the properties of the data in the lower 4 bit part such as address codes and the like, indicative of addressee or addressor. In the lower 4 bit part are stored data codes and the like directly associated with the content of the communication.

The flow of information between each control unit when the engine is started will now be explained with reference to FIGS. 4(b), 4(c), 5(a)-(c), 6, 7(a)-(c), 8(a)-(d).

When the initial set up of microcomputers for each control unit is completed by switching ON the ignition key, each control unit exchanges data through the communication line in order to confirm, in cross examination, the status and integrity of other control units.

Figure 4B:
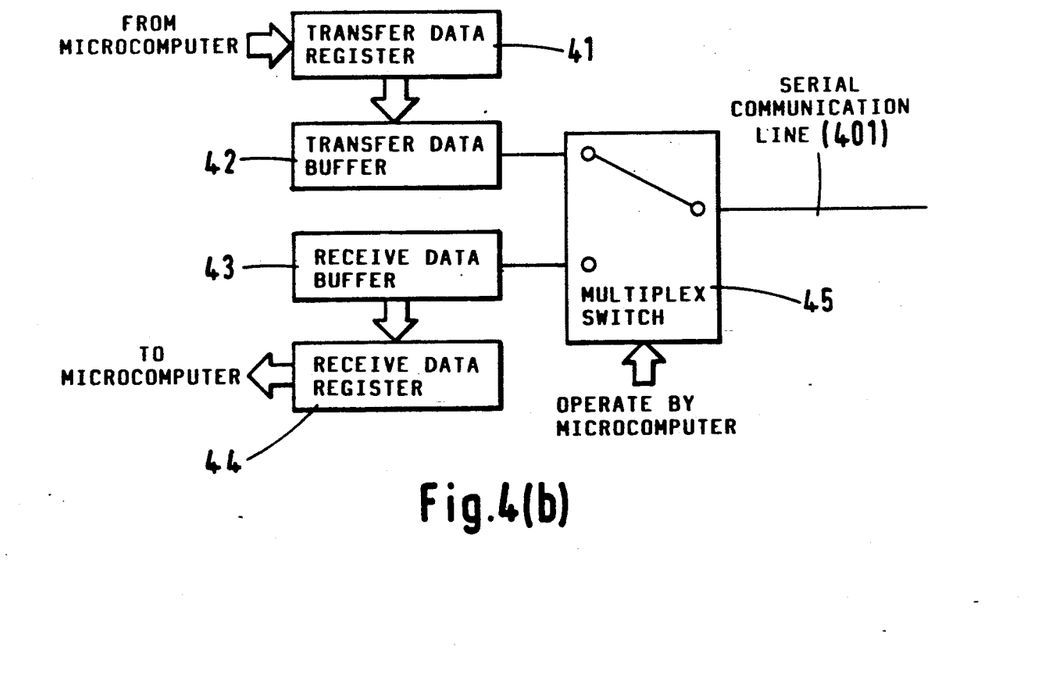
FIG. 4(b) shows a control unit microcomputer interface.

The exchange of data for each control unit is performed using a transmission and receiving arrangement as shown in FIG. 4(b). In this respect the microcomputer associated with each control unit has an interface unit as shown in FIG. 4(b) in which, if a microcomputer receives a data transfer request from another control unit, the microcomputer transfers data to a register 41 which automatically adds the "start" and "stop" bits. The register 41 transfers the data to a buffer store 42, thence to the serial data communication line 401 via a multiplex switch 45. The multiplex switch 45 is normally connected to a receive data buffer store 43 but when the microcomputer receives a data transfer request it changes the switch 45 to the transfer data buffer store 42. When data transfer is complete, the microcomputer changes the multiplex switch 45 back to the receive data buffer store 43. When data is received via the switch 45 to the buffer store 43, when the store 43 is full the 8-bit data is separated from the "start" and "stop" bits and transferred to a receive data register 44. The microcomputer then reads out the data from register 44 in an interrupt program sequence.

Regarding such confirmation, the microcomputer of the engine control unit 1 acts as a host computer, and the engine control unit 1 transmits a call (interrogation) signal to other control units. According to the status of response or answer back signals to the call signal, it is judged whether the control unit which was addressed exists.

Figure 4C:
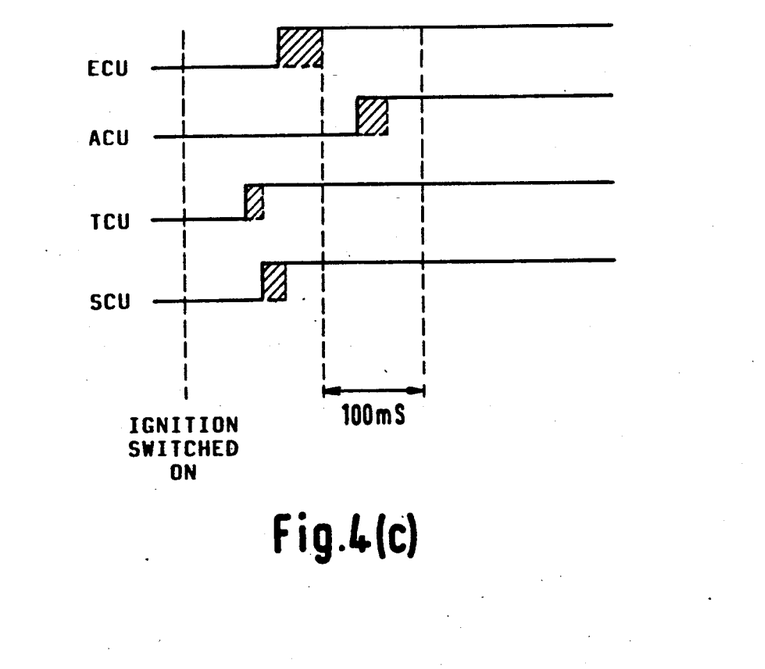
FIG. 4(c) shows initialisation times of different control units.

Although, as described later herein, data is stored for each control unit microcomputer for engine start up, which stored data is retained from the period when the engine was previously running, it is necessary to delay the control unit interrogation process until all the microcomputers in the various control units have been initialised. In this respect, each microcomputer has a different initialisation time and clearly interrogation cannot commence until all the microcomputers are operational. Thus, referring to FIG. 4(c), the initialisation time for each control unit (ECU, ACU, TCU, SCU) is shown from ignition switch ON. In the example of FIG. 4(c), it will be observed that the TCU is the first to commence initialisation and the ACU the last to commence initialisation. It will also be noted the time for initialisation of each control unit (shown by the crosshatched areas) is different for each control unit. Since the ECU in the presently described embodiment is assumed to be the host control unit, a data initialisation time greater than the initialisation time of the slowest control unit is set from the end of initialisation of the ECU, taken to be, for example, 100 ms.

Figure 5A:
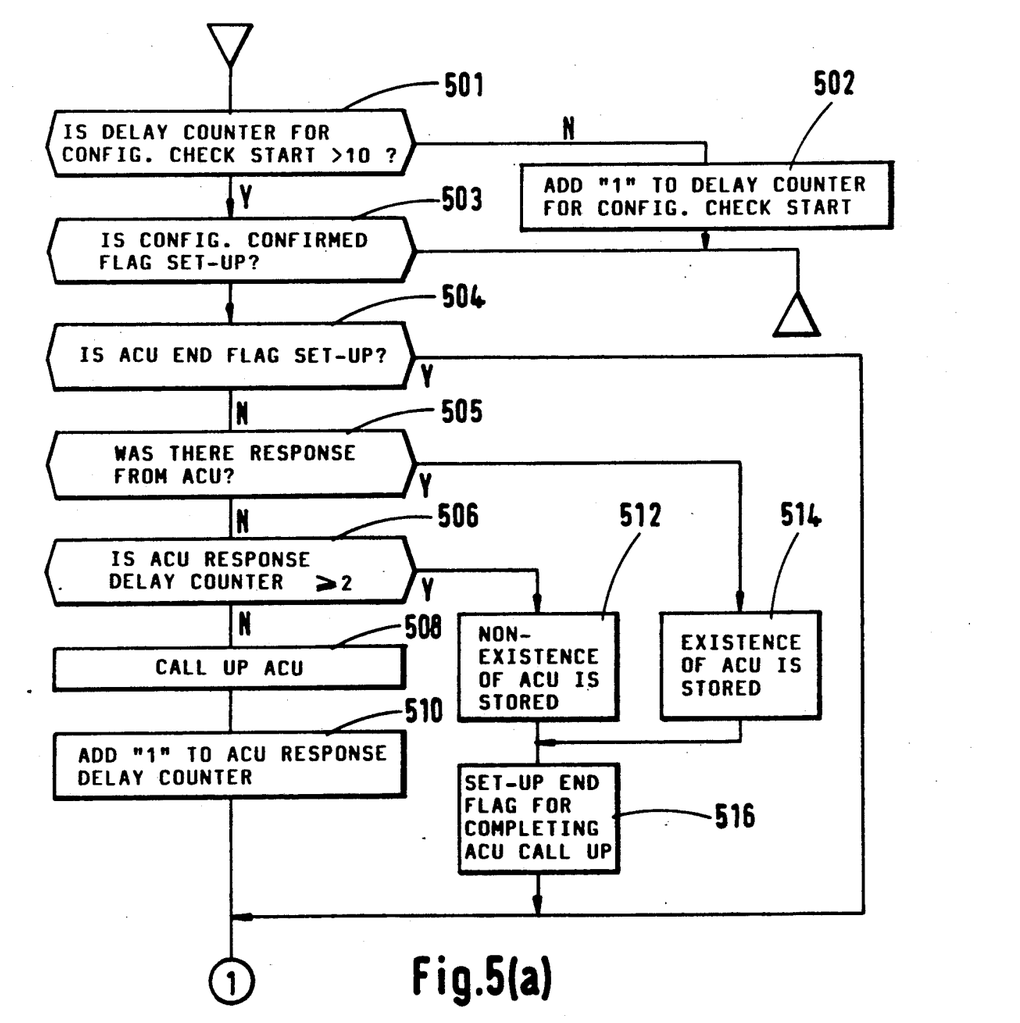
FIG. 5(a) is a flowchart explaining showing the engine control unit exchanges information with other control units and data configuration of transmitting and receiving signals.

The flow chart of FIG. 5(a) shows the sequence of operation of the engine control unit 1 during the engine starting.

Because the program sequence of FIGS. 5(a)-8(a) takes 10 ms to complete and is repeated at intervals of 100 ms so at step 501 a counter which is incremented by 1 at 1 ms intervals is checked to determine if the count is greater than 10, thereby indicating that 10 ms has elapsed since the end of the initialisation process of the ECU1. If the count is less than 10 a "1" is added after a 1 ms interval at step 502 and the flow stops. If, however the count is greater than 10, indicating the initialisation time delay has expired, then the program moves to step 503 to check whether or not a configuration flag has been set up; if it has not then the program moves to the end, but if it has, then the program moves to step 504.

In step 504, it is judged whether a flag indicating the completion of an ACU call is set up or not. The ACU call completion flag is intended to be set up in step 516 to indicate the completion of call up of the automatic gear shift control unit. When this flag is set up, this sequence of flow is terminated so as to shift to another sequential flow to confirm the status of other control units. If the flag is not set up, the sequence advances to step 505 to confirm the status of the automatic gear shift control unit.

In step 505, it is judged whether there has been a response from the automatic gear shift control unit or not, the response being, in particular, to the call made in step 508 to the automatic gear shift control unit.

Figure 5B:
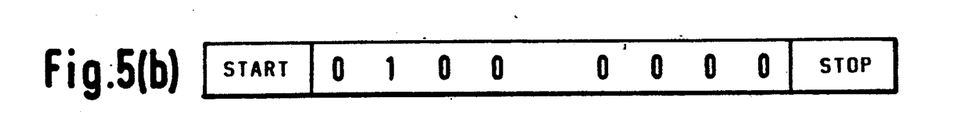
FIGS. 5(b) and 5(c) show the data configuration of transmitting and receiving signals.
Figure 5C:
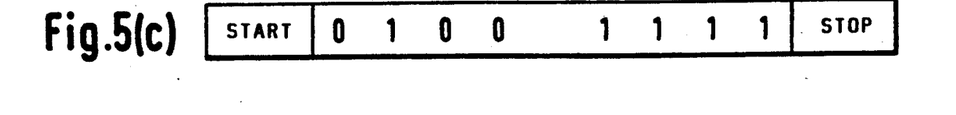

Further, in order to call up the automatic gear shift control unit, a signal as shown in FIG. 5(b) is output from the engine control unit to the communication line. The upper 4 bit output signal "0100" following the start bit is a code for confirming the existence of the automatic gear control unit, while the lower 4 bit output signal "0000" is a code indicating a call. In response to the call from the engine control unit, a signal as shown in FIG. 5(c) is output from the automatic gear shift control unit to the communication line. Like the above, the upper 4 bit signal "0100" preceded by the start bit is a code for confirming the existence of the automatic gear shift control unit, while the lower 4 bit signal "1111" is a code indicating a response or answer back.

However, if there is any abnormality in the automatic gear shift control unit, the automatic gear shift control unit outputs a signal different from the above. That is, a signal indicating the existence of an abnormality in the automatic gear shift control unit is stored in the upper 4 bit part following the start bit, and a signal indicating the details of the abnormality is stored in the lower 4 bit part.

Figure 6:
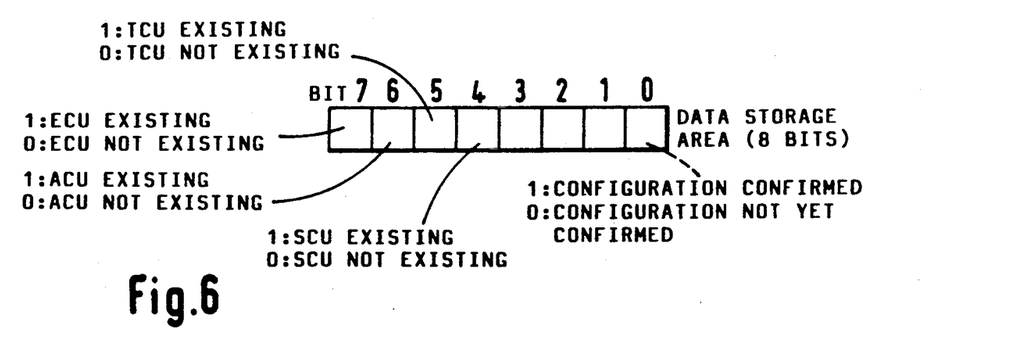
FIG. 6 shows a flag configuration indicating the existence of a control unit.

If a response is received in step 505 from the automatic gear control unit, the sequence advances to step 514, where, in order to store the information on the existence of the automatic gear shift control unit, a corresponding bit area in a RAM, as shown in FIG. 6, is entered as 1.

In addition, because the signal transmission line is linked with other control units as well as the engine control units, the information indicative of the existence of the automatic gear shift control unit is also received by the other control units each of which the store the information by setting up flag 1 in their respective RAM areas, as shown in FIG. 6. Thus, flag 1 is set indicative of the existence of the other control units which issued answer back (response) signals.

After storing flag 1 indicative of the existence of the automatic gear shift control unit in step 514, the sequence advances to step 516, where the end flag of ACU address call is set up, terminating the flow steps.

If there has been no response from the automatic gear shift control unit in step 505, the sequence advances to step 506 to wait for a response. In step 506, judgment is made whether the number of an ACU response delay counter is larger than 2 or not. The ACU response delay counter counts the number of the call addressed to the automatic gear shift control unit. The ACU response delay counter is reset to "0" every time the engine is started, and counts up the number of the address call to the automatic gear shift control unit.

In step 506, the ACU response delay counter is shown to be equal or larger than 2. This means that the address call to the automatic gear shift control unit was made twice, but as yet there has been no response. Thereby, judging that there exists no automatic gear shift control unit, the sequence proceeds to step 512, wherein, in order to store that no automatic gear shift control unit exists, "0" is entered in a corresponding RAM bit area as shown in FIG. 6. Further, by setting up an end flag for completing the ACU address call in step 516, this sequencing flow is terminated.

If the ACU response delay counter is not equal to nor larger than 2, the sequence advances to step 508 so as to re-address to the automatic gear control unit. Then advancing to step 510, count "1" is added to the ACU response delay counter, thereby terminating this sequencing flow.

After confirming the existence of the automatic gear shift control unit, sequencing steps as follows are executed next in order to confirm the existence of the traction control unit.

Figure 7A:
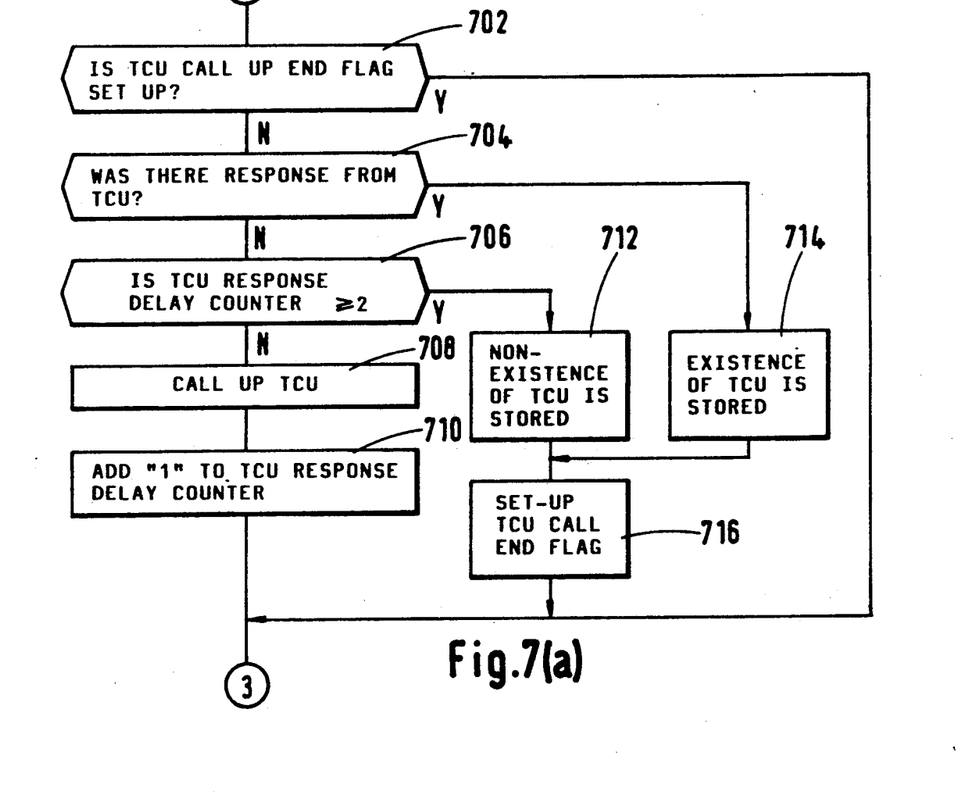
FIGS. 7(a)-(c), 8(a)-(d) and 9 show flowcharts of the exchange of information between the engine control unit and the other units, and data configurations of transmitting and receiving signals.
Figure 7B:
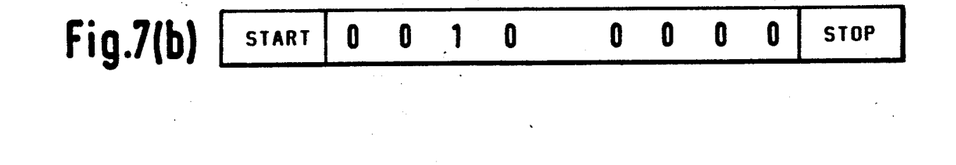
Figure 7C:
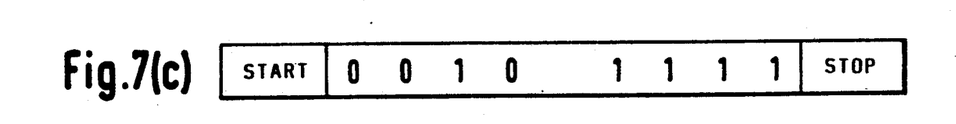

For this purpose, the engine control unit performs sequential steps as shown in the flow chart of FIG. 7(a). Initially, the engine control unit sends out an inquiry call whether or not the traction control unit exists in the control unit configuration by putting out a signal as shown in FIG. 7(b) through the communication line. The upper 4 bit output signal "0100" following the start bit is a code indicative of the existence of the traction control unit, while the lower 4 bit output signal "0000" is a code denoting the call. Responding to the call from the engine control unit, the traction control unit outputs a response signal as shown in FIG. 7(c) to the communication line. The upper 4 bit output signal after the start bit, like the above, is a code indicative of the existence of the traction control unit, while the lower 4 bit output signal is a code denoting the response to the call.

First, in step 702, it is judged whether an end flag for completing TCU call is set up or not. If the flag is set up, this sequencing flow is terminated. If not, the sequence advances to step 704.

In step 704, it is judged whether there has been an answer back from the traction control unit or not. If the answer back from the traction control unit is confirmed, the existence of the traction control unit is stored in step 724, the end flag for completing the TCU call is then set up in step 716, thereby terminating this sequencing flow.

If there has been no answer back from the traction control unit in step 704, it is judged in step 706 whether the number of a TCU response delay counter is equal to or larger than 2. If the number of the TCU response delay counter is larger than 2, it is stored in step 712 that the traction control unit does not exist. An end flag for completing the TCU call is set up in step 716, thereby terminating this sequencing flow.

When the number of the TCU response delay counter is not larger than 2 in step 704, the traction control unit is re-addressed in step 708, with count "1" being added to the number of the TCU response delay counter in step 710, thereby terminating this sequencing flow.

Figure 8A:
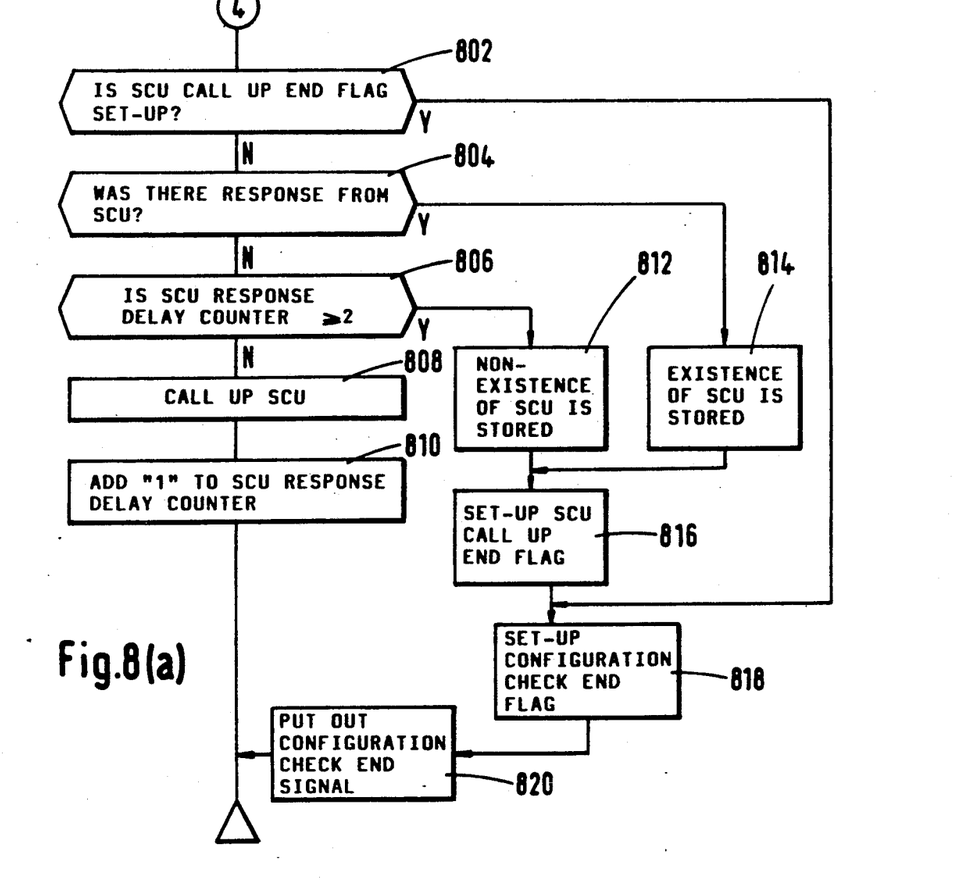

After the existence of the traction control unit is confirmed, as a next step, the existence of the suspension control unit is confirmed in a like manner. To accomplish this object, the engine control unit is operated in accordance with the sequence as shown in the flow chart in FIG. 8(a). At first in step 802, it is judged whether an end flag for the completion of the SCU call is set up or not. If the flag is confirmed to have been set up, an end flag for the completion of the configuration check will be set up in step 818. If the flag is not set up in step 802, it is judged in the following step 804 whether there has been an answer back from the suspension control unit or not, i.e., whether there has been an output as shown in FIG. 8(c). Here, the upper 4 bit output signal "0001" after the start bit is a code indicative of the existence of the suspension control unit.

If the answer back is confirmed here, information on the existence of the suspension control unit is stored in step 814, then in step 816 an end flag for indicating completion of the SCU call is set up, subsequently an end flag is set in step 818 for the completion of the configuration check.

This end flag for indicating completion of the configuration check declares the end of call by the engine control unit to each control unit.

If there has been no response from the suspension control unit in step 804, the sequence advances to step 806, where it is judged whether the number of the SCU response delay counter is equal to 2 or larger. If the number is greater than 2, it is stored in step 812 that there exists no suspension control unit, subsequently an end flag for the completion of the SCU call is set up in step 816, thereafter an end flag for the completion of the configuration check is set up in step 818.

Figure 8B:
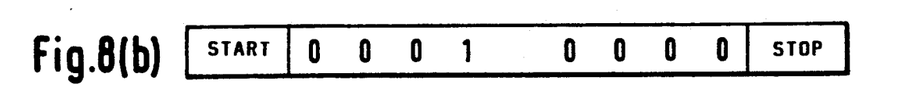
Figure 8C:
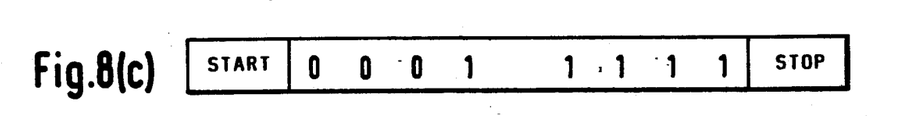

If the number of the SCU response delay counter is not greater than 2 in step 806, a call sequence addressing to the suspension control unit is performed in the next step 808 by putting out a call signal like that shown in FIG. 8(b) to the communication line. A "1" count is added to the number of the SCU response delay counter in the next sequence step 810, thereby terminating the flow.

Figure 8D:
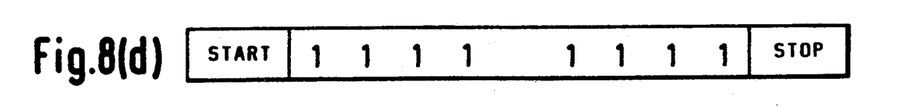

In addition, when the end flag for the completion of the configuration check is set up in step 818, an end signal as shown in FIG. 8(d) declaring the completion of the configuration check in the engine control unit is output to the communication line to inform each control unit of the end of this sequencing flow.

Figure 9:
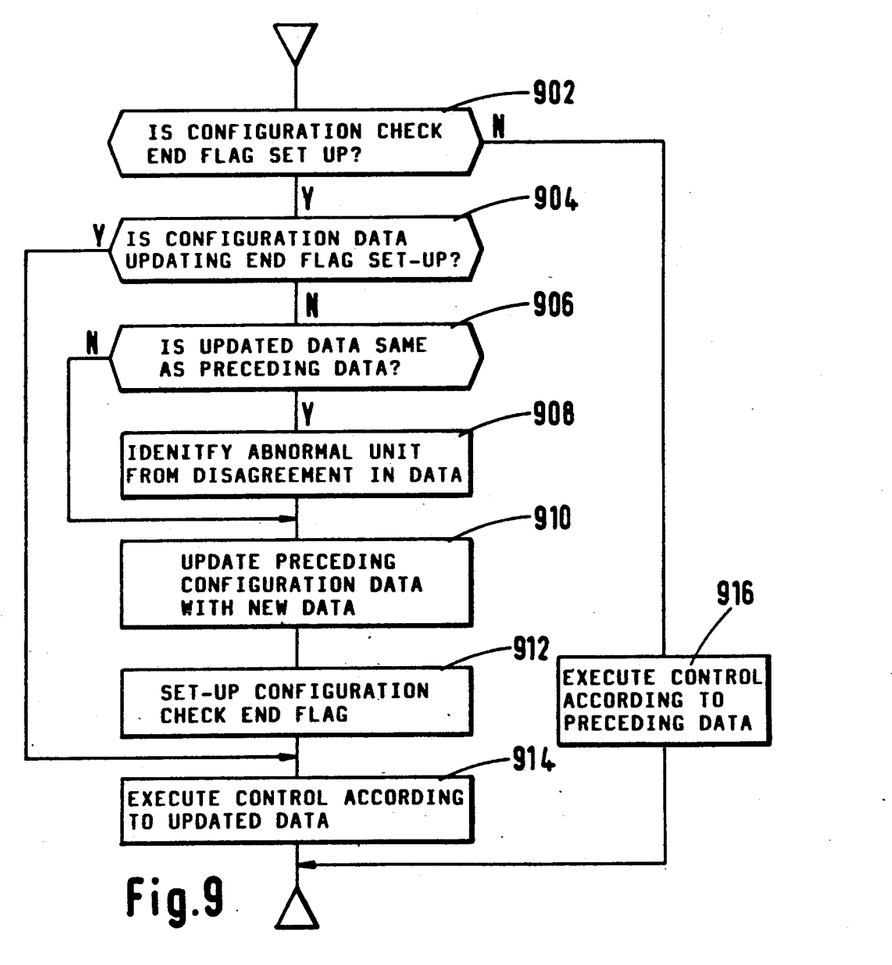

Next, updating the configuration data on engine control for the engine control unit will be described with reference to FIG. 9.

The microcomputer for the engine control unit starts arithmetic calculation of engine control values such as the amount of fuel to be injected, ignition timing and the like only after an initial setting of parameters is completed. The microcomputer for the engine control unit performs each control function on a time-sharing basis and in parallel. In carrying out such controls, because the engine control unit retains the data representing the preceding configuration of the control units which had been checked and used in the previous run, it performs its control based on the preceding data in memory until the check of parameters for a new control unit configuration is completed.

Initially, it is judged whether an end flag representing the completion of configuration checking is set up in step 902 or not. If the configuration check flag is not set up, it is judged that existence of each control unit or the like is not yet confirmed, thereby, at step 916, executing control operation according to the preceding configuration data.

In step 904, it is judged whether an end flag for updating configuration data is set up or not. This end flag for updating configuration data is one representing that a process to transfer new configuration data to a back-up RAM, which is to be set up in step 910, has been completed lest it should be erased. With the completion of the transfer, the flag is changed to "1". When the end flag for the completion of updating configuration data is set up in step 912, the sequence skips over to step 914, allowing control in accordance with the newly updated configuration data.

When the end flag for updating configuration data is not set up, after comparing new configuration data with the preceding data, a possible malfunctioning control unit is identified, thereafter updating configuration data is accordingly executed. Further in step 906, it is judged whether the new configuration data is the same as the preceding configuration data or not. If it is the same, the sequence skips over to step 910. If the data is not the same, it means that the control unit which had existed in the preceding configuration check performed when the ignition was turned on is no longer present. Thus, in step 908, the abnormal or absent unit is identified from the data showing discrepancies. Further, in order to guarantee the minimum necessary functions to actuators associated with the abnormal control units, the engine control unit is provided with fail-safe functions which outputs substituting, pseudo-signals in place of an adjudged abnormal unit. After the judgment on the abnormal unit, the sequence advances to step 910.

In step 910, the preceding configuration data is updated by new configuration data, thereby setting up an end flag for completing the configuration check in step 912. Further, the sequence advances to step 914, effecting control according to the updated data.

Figure 10:
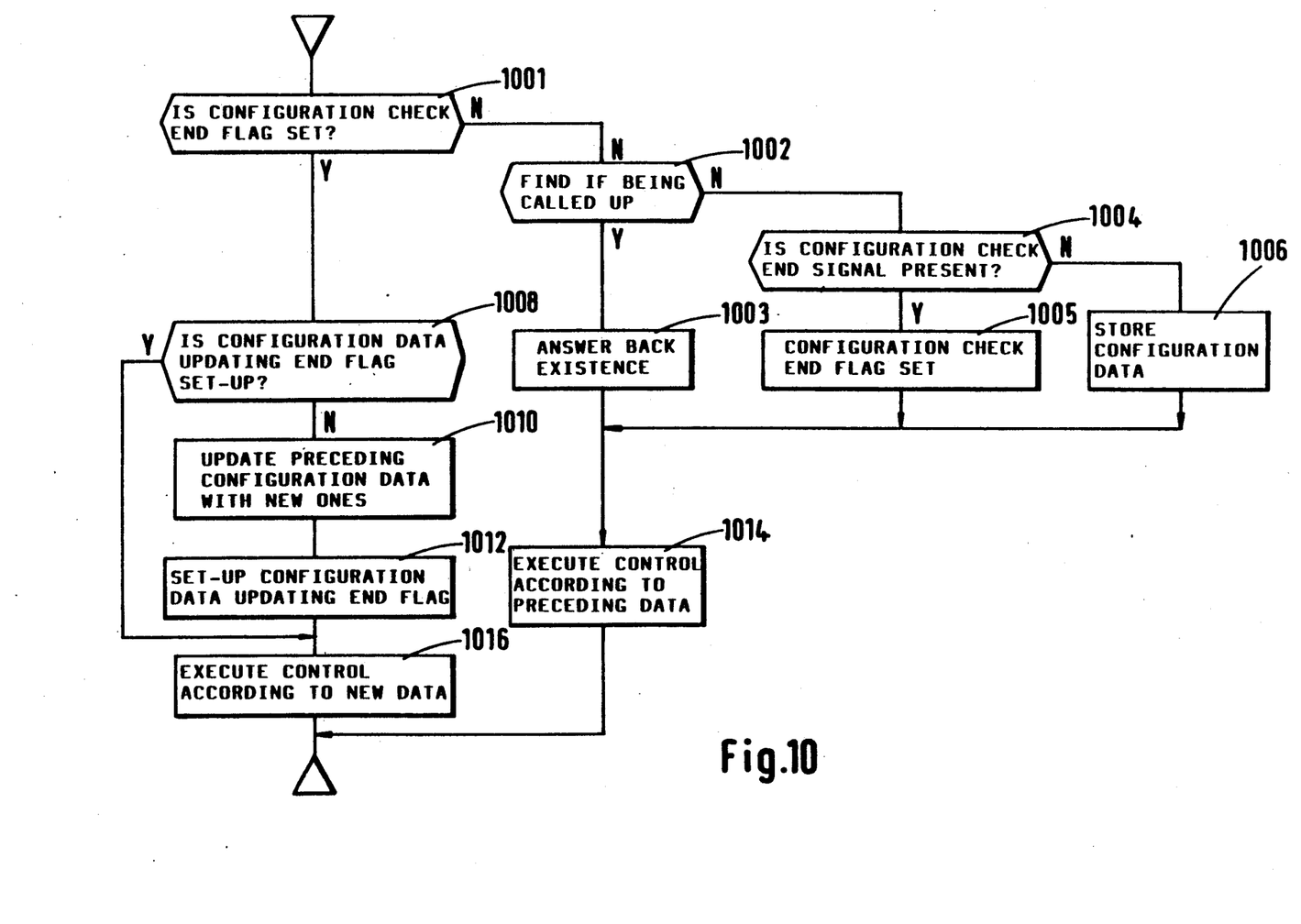
FIG. 10 shows a flowchart of the sequence of updating the configuration data in control units other than the engine control unit.

Next, updating of the configuration data in each of the other control units (ACU, TCU, SCU) will be explained with reference to the flowchart in FIG. 10.

At step 1001 each control unit determines if it has been interrogated and checks if a flag indicating the end of configuration is present (i.e. whether the end bit shown in FIG. 6 is "0" or "1"). If a flag is set the flow steps to step 1008. If a flag is not set the sequence moves to step 1002 where the control unit determines whether or not it is being called up. If the unit is being called up it answers back at step 1003 and the sequence moves to step 1014. If the unit is not being called up it is determined at step 1004 if the check end signals from step 820 is present. If the configuration end check signal is present then at step 1005 an end flag is set and the flow moves to step 1014. If the configuration end check signal is not present then the configuration data is stored (step 1006) before moving to step 1014.

At step 1014 control operation according to the preceding configuration data is performed, thereafter terminating the flow.

If the end flag for completing the configuration check is set up, in the next step 1008 it is judged whether an end flag for updating the configuration data is set up or not. If it is set up, the sequence skips over to step 1012. If not, in the next step 1010 the preceding configuration data is updated by new configuration data, thereafter the sequence advancing to step 1016. In step 1012 the end flag for completing the updating of the configuration data is set up.

In the step 1016, control according to the new configuration data is performed, thereby terminating the flow.

Figure 11A:
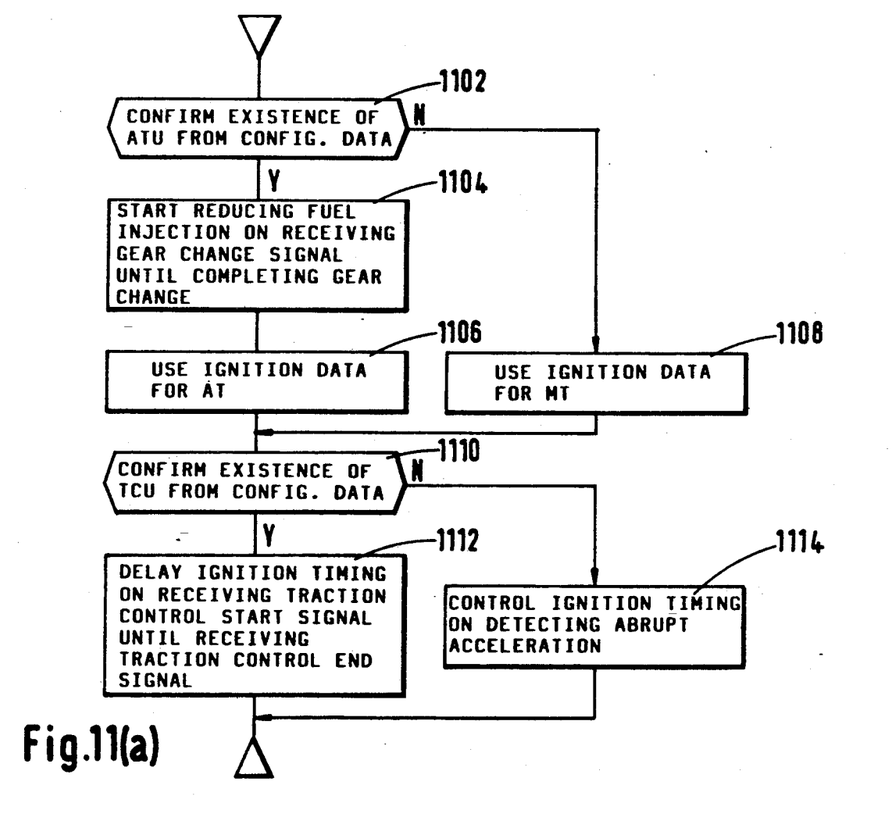
FIG. 11(a) shows a flowchart of the details of control of the engine control unit.
Figures 13A, 13B:
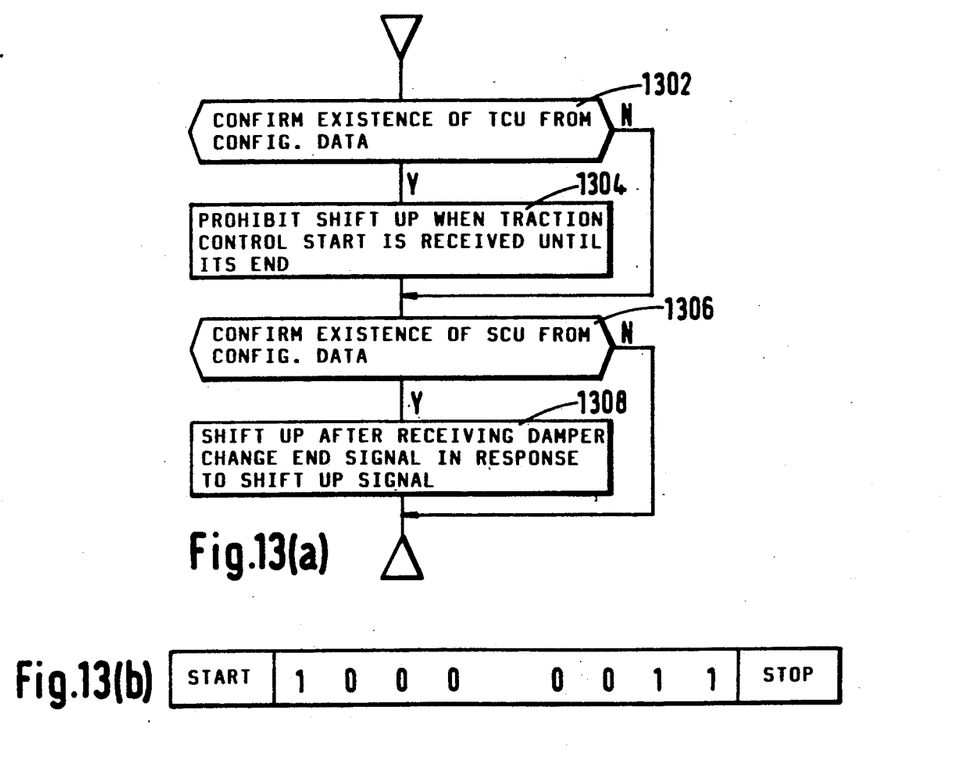

An exemplary control practice of each control unit using the configuration data as explained above will now be explained referring to FIGS. 11 to 3.

Figure 11B:
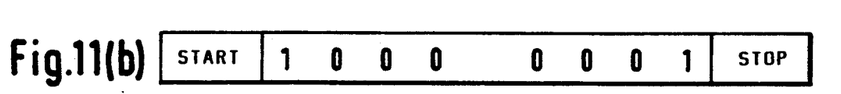
FIGS. 11(b)-(e) show data configurations of transmitting and receiving signals.
Figure 11C:
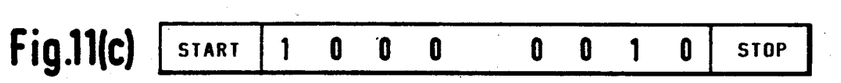

With regard to the engine control unit, in step 1102 in the flowchart of FIG. 11(a), it is judged, in view of the configuration data, whether there exists an automatic gear shift control unit. If none is confirmed, the control is performed according to the ignition data of step 1108 prepared for the manual control of gears, thereafter advancing to step 1110. If the existence of the automatic gear shift control unit is confirmed, and when a gear change signal as shown in FIG. 11(b) is received in step 1104, frequency of fuel injection is reduced until an end signal for the gear change is received as shown in FIG. 11(c), thereby reducing shock at a gear change by limiting the engine torque by means known per se, or by reducing the amount of fuel to be injected. Thereafter in step 1106, ignition timing is controlled according to the ignition timing data predeterminedly prepared for the vehicle automatic transmission.

Figure 11D:
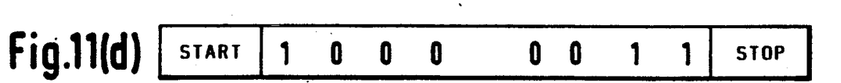
Figure 11E:
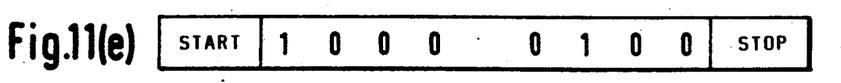

In step 1110, it is judged from the configuration data if the traction control unit exists. If none exists, and when abrupt acceleration is detected in step 1114, ignition timing is controlled to be delayed, thereafter terminating this flow. When the traction control unit is confirmed to exist from the configuration data, and when a traction start signal as shown in FIG. 11(d) is received in step 1112, the ignition timing is delayed until a traction end signal, as shown in FIG. 11(e), is received, thereafter terminating this flow.

Figures 12A, 12B:
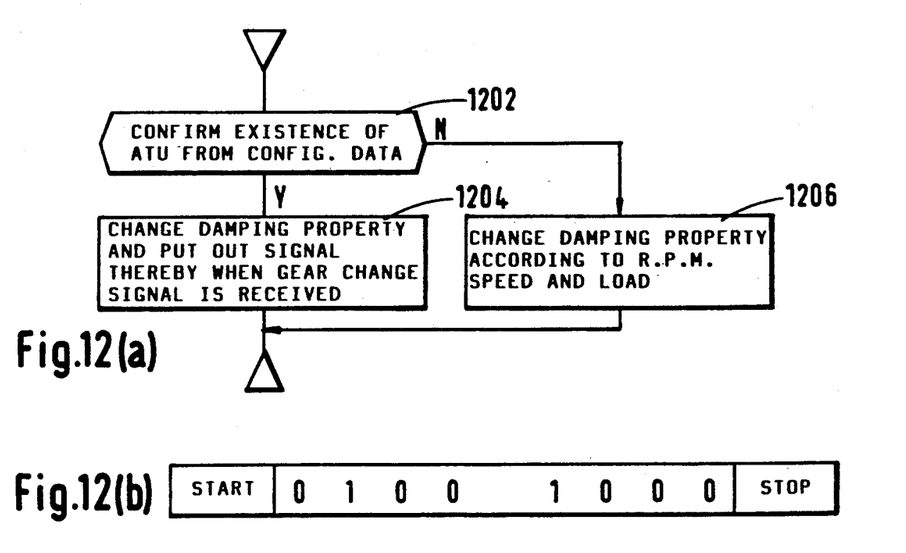
FIG. 12(a) shows a flowchart of the details of control for a suspension change unit.
FIG. 12(b) shows the data configuration of a transmitted damping charge signal.

Referring to the flowchart of FIG. 12(a), the suspension control unit judges whether there exists the suspension control unit from the configuration data in step 1202. When it is judged that none exists, the damping coefficient of the suspension is varied according to the engine revolutions, vehicle speed and load, thereby terminating this flow. When a suspension control unit is judged to exist, and when the above gear change signal (FIG. 11(b)) is received, the damping coefficient of the suspension is varied accordingly, which damping change signal as shown in FIG. 12(b) is output to the communication line, thereafter the flow is terminated.

Referring to the flowchart in FIG. 13(a), the automatic gear shift control unit judges if the traction control unit exists from the configuration data in step 1302. If it judges there is none, it skips over to step 1306. If one exists, and when the above traction control start signal is received, a shift up of the gear is prohibited until the above traction end signal is received, thereafter advancing to step 1306.

In step 1306, it is judged whether there exists the suspension control unit from the configuration data. If there is none, the flow is terminated. If there is one, after outputting a shift up signal as shown in FIG. 13(b) to the communication line in step 1308, and also after the above damping change completion signal is received, an actual shift up is performed, thereafter terminating the flow.

As described above, by using this invention, one control module set is possible to cope with a variety of combinations of control, thereby substantially improving mass production capability. In addition, when installing optional equipment or replacing control units, there need be no adjustment of the pre-existing and the newly installed equipment or units, thus, greatly facilitating improved serviceability in the marketplace.

Further, because each module or its microcomputer can be designed and developed independently of one another, and they can be easily linked together after the development, efficiencies in design and development have been greatly improved.

Figure 14:
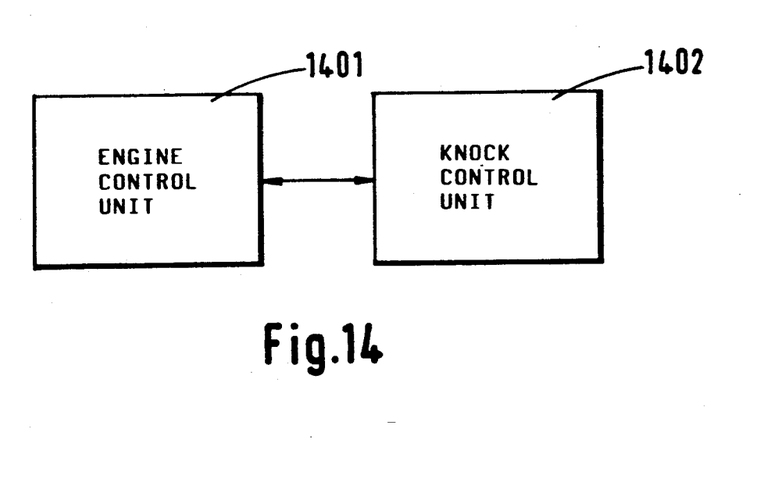
FIG. 14 shows a configuration of control units in accordance with a second embodiment of this invention.

A second embodiment of the present invention will now be explained with reference to FIGS. 14 and 15. Referring to Figure 14, the engine control unit (ECU) and a knock control unit (KCU) are connected by a serial communication line. The engine control unit and the knock control unit may be mounted on the same printed circuit board, or in a single unit.

With regard to the knock control unit, it may or may not be needed, even for the same type of engine. In this respect, according to the engine shipment destination, variation in the quality of gasoline may be evidenced and by installing a knock control unit, a variety of control specifications can be handled.

Figure 15:
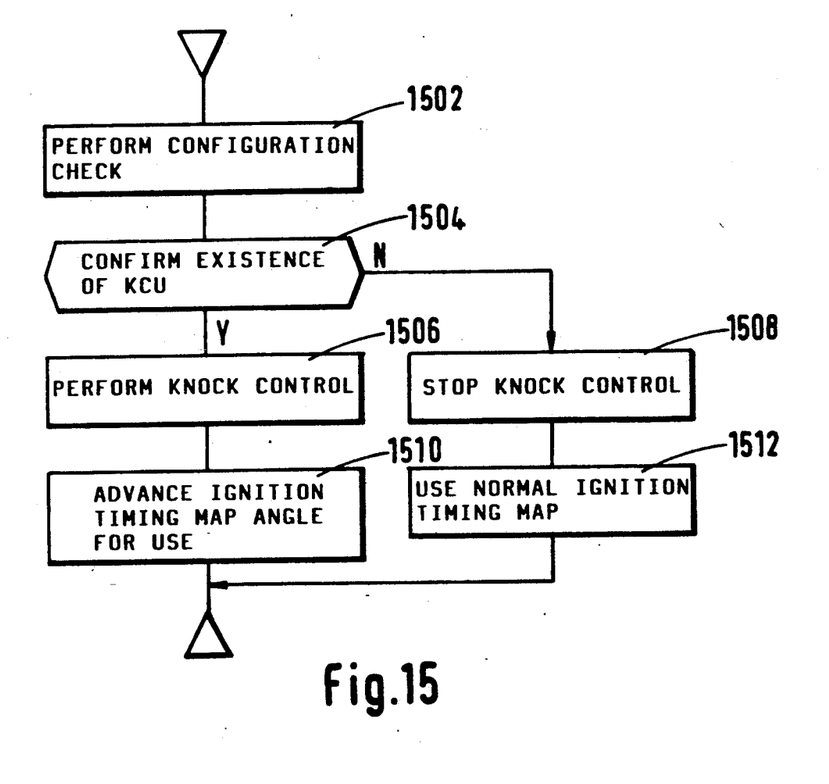
FIG. 15 is a flowchart of the details of control of the second embodiment.

Referring to the flowchart in FIG. 15, the engine control unit checks in step 1502 the configuration of control data, and judges if the knock control unit exists. If the knock control unit is confirmed to exist, in step 1504, knock control is performed in step 1506, and in step 1510 the ignition timing is controlled to perform at an advanced map angle, thereafter terminating the flow.

On the other hand, if no knock control unit is determined in step 1504, the knock control is stopped in step 1512, and a normal ignition timing map is employed for use in step 1512, thereby terminating the flow.

Further, because each control unit is initialized simultaneously at the time when the power source is switched on, the step 1502 is performed as the first execution after the normal initialization setting so as to prevent control malfunction.

In the second embodiment of this invention, if there is need for engine knock control, it can be accomplished simply by adding a knock control unit, thereby effecting substantial improvement in design efficiency, and providing a low cost vehicle control unit. Further, this embodiment is advantageous when mutual self-diagnosis regarding integrity of control units is needed.

It will be appreciated by those skilled in the art that the parameter calculation for a particular actuator may not be performed by the control unit with which the sensor therefor is most closely associated. For example, the knock control unit may simply determine from a sensor that knocking exists and the calculation for control of ignition timing may be performed by the engine control unit.

As described above, the control system of the embodiments of the present invention make it possible to perform a cooperative control in response to a total configuration of constituent control units without requiring changes in control details, thereby facilitating individual development of control units, and improving mass production capability and serviceability in use.

It will be understood by those skilled in the art that various amendments and modifications may be made to the above described exemplary embodiments without departing from the spirit and scope of the invention which is defined by the appended claims.

We claim:

1. A control unit for a motor vehicle control system, said control unit comprising:

means for connection to a sensor and for calculating a control parameter based upon data derived from an output of said sensor;

means for driving at least one actuator means in accordance with said calculated parameter;

means for communicating with other control units;

transmitting means for transmitting an interrogation signal to said other control units;

receiving means for receiving response signals from said other control units in response to said interrogation signals; and modifying means connected with said receiving means for adaptively varying said control parameter in dependence upon the existence of the responses received by said receiving means.

2. A control system as claimed in claim 1 wherein initialisation means are provided to provide a delay time from motor vehicle ignition switch ON before the control units commence transmitting interrogation signals.

3. A motor vehicle control system having a plurality of control units each having means for calculating a control parameter based upon data derived from an associated sensor output and for driving at least one associated actuator means in accordance with the calculated parameter, wherein each control unit comprises:

transmitter means for transmitting interrogation signals to other control units;

receiving means for receiving response signals from said other control units in response to said interrogation signals; and said system including modifying means connected to said receiving means for adaptively varying the control parameter in dependence upon the existence of responses received by said receiving means.

4. A control system as claimed in claim 3 wherein the interrogation signal is a serial communication signal comprising a start bit, data bit and a stop bit.

5. A control system as claimed in claim 4 wherein the communication signals include an upper bit portion denoting a control unit address and a lower bit portion denoting controlling information relative to the control unit.

6. A control system as claimed in claim 3 wherein the interrogation signal is transmitted at least twice to said other control units for redundancy purposes to ensure reception by said other control units.

7. A control system as claimed in claim 3 wherein said interrogation signal is transmitted when the vehicle ignition switch is turned on.

8. A control system as claimed in claim 3 wherein the modifying means includes a memory means for retaining stored data pertaining to received response signals and means for writing in said memory means the existence of a received response signal.

9. A control system as claimed in claim 8 wherein there is provided a comparing means for comparing a received response signal with a previously stored response signal, and an abnormality judging means for identifying an absence of a said interrogated control unit or abnormality in the interrogated control units by utilizing the compared results from said comparing means whereupon said system is adaptively configured.

10. A control system as claimed in claim 9 wherein a pseudo-signal generator means is provided for outputting a fail-safe signal in simulation of a normal output signal from a said other control unit which is adjudged by said abnormality judging means to have an abnormality.

11. A control system as claimed in claim 10 wherein the modifying means comprises a microcomputer which microcomputer includes said memory means, writing means, comparing means, abnormality judging means and said pseudo-signal generating means.

12. A control system as claimed in claim 8 wherein each control unit has means for continuing the function thereof in accordance with data stored in the memory means until a response signal is received to the interrogation signal.

13. A control system as claimed in claim 8 wherein each control unit outputs a configuration checking termination signal after confirming the existence of said response signals.

14. A control system as claimed in claim 13 wherein each control unit comprises an updating means to update data stored in said memory means after confirming the existence or non-existence of said response signal.

15. A control system as claimed in claim 3 wherein each control unit is linked by a serial communication line.

16. A control system as claimed in claim 3 wherein one of said control units acts as a host transmitting interrogation signals to the other control units.

17. A control system as claimed in claim 16 wherein all said other control units provide response signals to all the control units.

18. A control system as claimed in claim 16 wherein the host control unit is an engine control unit and the other units are at least one of an auto-gear shift control unit, a traction control unit, a suspension control unit, and a knock control unit.

19. A control system as claimed in claim 16 wherein said host control unit initially acts upon preceding data stored in said memory means at a time of ignition switch ON.

* * * * *